Patented June 20, 1939

2,163,180

UNITED STATES PATENT OFFICE 2,163,180

OXIDATION OF VINYL SULPHIDES

Hanns Ufer, Ludwigshafen-on-the-Rhine, Germany, assignor to I. G. Farbenindustrie Aktiengesellschaft, Frankfort-on-the-Main, Germany No Drawing. Application May 11, 1935, Serial No. 20,988. In Germany May 19, 1934

7 Claims. (Cl. 260—607)

The present invention relates to the production of organic vinyl sulphoxides and vinyl sulphones.

I have found that vinyl sulphoxides and vinyl sulphones, i. e. compounds containing sulphur and oxygen and corresponding to the general formula $(CH_2=CH-SO_n)_xR$, in which R may be an alkyl, cycloalkyl, aryl, aralkyl or heterocyclic radicle and $n$ is a whole number up to two and $x$ is a whole number, can be obtained in a simple manner and in good yields by treating under mild reaction conditions vinyl sulphides with agents supplying oxygen. Any vinyl sulphide of the general formula $CH_2=CHSR$, in which R may be an alkyl, cycloalkyl, aryl, aralkyl or heterocyclic radicle, as for example ethyl, propyl, butyl, stearyl, oleyl, cyclohexyl, phenyl, naphthyl, benzyl and phenylethyl or mercapto benzothiazyl radicles, can be employed for the present process. Furthermore poly-vinyl sulphides, as for example phenyl-1.3-divinyl-sulphide, may be employed in the present process. The radicles may be substituted with any number or kind of substituents, as for example with alkyl, hydroxyalkyl or nitro groups or halogen.

In the preparation of the said vinyl sulphoxides and vinyl sulphones the employment of mild reaction conditions is necessary. Oxidizing agents which may suitably be employed are for example: per-acids and their salts, inorganic and organic peroxides and hypochlorites. The preparation of the vinyl sulphoxides and sulphones may also be effected by anodic oxidation. The oxidation is carried out in alkaline to slightly acid solution, because in the case of a strong acid reaction the vinyl sulphides may undergo a far-reaching change by condensation, polymerisation or by the splitting off of vinyl groups. For the same reason the employment of agents combining with acids or of buffer mixtures may be advantageous. The oxidation may furthermore be rendered milder by the addition of diluents or solvents, as for example water, alcohols, such as methyl, ethyl and butyl alcohols, ketones, such as acetone and methyl-ethyl ketone, ethers, such as diethyl ether and dibutyl ether or hydrocarbons, such as benzene and toluene. The reaction conditions are adjusted according to the desired final products. For example if it is desired to prepare vinyl sulphoxides by means of hydrogen peroxide, it is preferable to select low temperatures, as for example between 10° below zero and 50° C. and to avoid an excess of oxidizing agent. If, on the other hand, it is desired to prepare vinyl sulphones, higher temperatures, as for example between 50° and 120° C. or still higher and an excess of oxidizing agent is of advantage. In the preparation of vinyl sulphoxides with sodium hypochlorite, high temperatures, as for example from 30° to 100° C., and a large excess of oxidizing agent are also employed. The reaction conditions which are most favourable in each case may be readily ascertained by a simple preliminary experiment.

The vinyl sulphoxides and vinyl sulphones may be employed as intermediate products for the preparation of dyestuffs.

The following examples will further illustrate how my invention may be carried out in practice, but the invention is not restricted to these examples. The parts are by weight.

Example 1

150 parts of vinyl-para-thiocresyl ether (obtainable by the addition of acetylene to para-thiocresol according to Example 1 of the copending application Ser. No. 744,534) are mixed with 300 parts of concentrated hydrogen peroxide and heated to about 100° C. The oil which at first floats on the water, sinks below the surface after a short time. In order to complete the oxidation, heating is continued for another hour and the reaction mixture is then cooled. The vinyl-para-tolyl sulphone obtained in a crystalline form is purified by crystallization from ligroin. The sulphone is obtained in an almost quantitative yield in the form of colorless crystals having a melting point of from 65° to 66° C.

The same product is obtained when glacial acetic acid is added after the union of the vinyl-para-thiocresyl ether and hydrogen peroxide.

Example 2

200 parts of vinyl-ortho-thiocresyl ether are mixed with 400 parts of concentrated hydrogen peroxide and heated for about four hours at about 100° C. The vinyl-ortho-tolyl sulphone which is formed in a very good yield solidifies after cooling and may be obtained in a pure form by crystallization from ligroin. The melting point of the pure product is about 60° C.

The corresponding sulphones may also be prepared from vinyl-2.4-dimethyl-5-chlorphenylsulphide and 1.8-chlorvinyl-naphthylsulphide or other vinyl ethers of mono- or poly-valent mercaptans as for example from the vinyl ether of 1,3 disulphhydryl benzene in an analogous manner.

Example 3

25 parts of concentrated hydrogen peroxide are added while stirring and cooling to a temperature of from 0° to 5° C. to a solution of 50 parts of 1,8-chlorthionaphthol-vinyl ether in 50 parts of acetone. The whole is then stirred for 24 hours, the temperature rising to room temperature. After allowing the mixture to stand for another 24 hours at room temperature, the 1.8-chlornaphthyl-vinyl sulphoxide which has collected as an oil at the bottom of the vessel is separated and obtained in a pure form by repeated shaking with ligroin.

In an analogous manner other vinyl ethers of mono- or polyvalent mercaptans, for example the vinyl ethers of thiocresols, di- and polysulphhydryl benzenes or other mono- or polyvalent mercaptans of iso- or heterocyclic compounds, as for example mercaptobenzo-thiazyl-vinylsulphide may be converted into the corresponding sulphoxides.

Example 4

Into a mixture of 40 parts of vinyl ethyl sulphide and 2 parts of pyridine, 120 parts of 30 per cent hydrogen peroxide are allowed to drop at from 70° to 80° C. The whole is stirred for some time at the said temperature. An oil separates which is washed twice with sodium carbonate solution, then twice with water and then three times with ligroin. Vinyl ethyl sulphone is obtained in the form of a yellow oil which is readily soluble is hot ethyl alcohol but scarcely soluble in water or ligroin.

Example 5

Into a solution of 50 parts of vinyl ethyl sulphide in 50 parts of acetone 64 parts of 30 per cent hydrogen peroxide are dropped while stirring between zero and 5° C. The mixture is stirred for further 12 hours at the temperature indicated and then for 40 hours at room temperature. A clear solution is obtained. The acetone and the water are then evaporated under reduced pressure. The residual oil, which is of a yellow color, is purified by means of ligroin and some ether. The vinyl ethyl sulphoxide thus obtained is readily soluble in cold water and ethyl alcohol.

Example 6

100 parts of octodecyl vinyl sulphide melting at between 33 and 34° C. and boiling at from 211 to 213° under a pressure of 8 millimeters (mercury gauge) are suspended in 1250 parts of hot water and added to 315 parts of a 12 per cent sodium hypochlorite solution at a temperature of 80° C. while stirring. The mixture is stirred for another 3 to 4 hours at from 80 to 90° C.

After cooling the solid reaction product is separated from the aqueous solution and purified by crystallization from ligroin. The octodecyl vinyl sulphoxide thus obtained in the form of colorless crystals has a melting point of about 60° C.

Example 7

50 parts of 30 per cent hydrogen peroxide are added, while stirring, to 50 parts of octodecyl vinyl sulphoxide obtained according to Example 6 at a temperature of from 70 to 80° C. the mixture being stirred for another 4 hours at from 80 to 85° C. After cooling, the crystals obtained are separated off, comminuted, washed with acetone and recrystallized from a small amount of ligroin. The octodecyl vinyl sulphone thus obtained forms colorless crystals which have a melting point of from 57 to 59° C.

Example 8

A mixture of 15 parts of vinyl-para-tolyl sulphide and 130 parts of a 12 per cent aqueous solution of sodium hypochlorite is stirred for about three hours at 90° C. The emulsion thus formed is filtered, whereby vinyl-para-tolyl sulphoxide of the formula

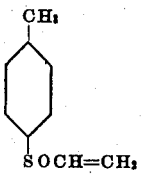

separates as an oil which is heavier than water. It is difficultly soluble in cold ligroin and water but readily soluble in acetone and hot ligroin.

The same product is obtained by reacting hydrogen peroxide with vinyl-para-tolyl sulphide while cooling with ice.

Example 9

A mixture of 30 parts of vinyl-beta-naphthyl sulphide and 60 parts of 30 per cent hydrogen peroxide is stirred for about 4 hours at about 100° C. The oil which floats at first on the water sinks to the bottom after some time. After cooling, the oil is separated.

The vinyl-beta-naphthyl sulphone of the formula

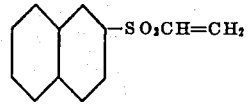

thus obtained after crystallization from cyclohexane, forms colorless crystals melting at 94° C.

What I claim is:

1. Vinyl compounds of the general formula: $CH_2=CH-X-R$ in which X stands for a radical selected from the group consisting of sulphoxide and sulphone radicals, and R stands for a member selected from the group consisting of radicles of aliphatic and cycloaliphatic hydrocarbons containing at least 6 carbon atoms, aliphatic-aromatic and aromatic hydrocarbons, their halogen, nitro- and hydroxy-alkyl substitution products, which radical is inert to the action of oxidizing agents selected from the group consisting of peroxide compounds and hypochlorites.

2. Vinyl sulphoxides the sulphur atom of which is connected with one vinyl group and with an organic radical selected from the group consisting of radicles of aliphatic and cycloaliphatic hydrocarbons containing at least 6 carbon atoms, aliphatic-aromatic and aromatic hydrocarbons, their halogen, nitro- and hydroxy-alkyl substitution products, which radical is inert to the action of oxidizing agents selected from the group consisting of peroxide compounds and hypochlorites.

3. Vinyl sulphones the sulphur atom of which is connected with one vinyl group and with an organic radical selected from the group consisting of radicles of aliphatic and cycloaliphatic hydrocarbons containing at least 6 carbon atoms, aliphatic-aromatic and aromatic hydrocarbons, their halogen, nitro- and hydroxy-alkyl substitution products, which radical is inert to the action of oxidizing agents selected from the group consisting of peroxide compounds and hypochlorites.

4. Vinyl sulphoxides, the sulphur atom of which is connected with one vinyl group and with a radicle selected from the group consisting of radicles of aliphatic hydrocarbons containing at least 6 carbon atoms, and their halogen, nitro and hydroxyl substitution products, the said radicle being inert to the action of oxidizing agents selected from the group consisting of peroxide compounds and hypochlorites.

5. Octodecyl vinyl sulphoxide.
6. Oleyl vinyl sulphoxide.
7. Tolyl vinyl sulphone.

HANNS UFER.